United States Patent [19]

MacKay

[11] Patent Number: 5,253,071
[45] Date of Patent: Oct. 12, 1993

[54] METHOD AND APPARATUS FOR STABILIZING AN IMAGE PRODUCED IN A VIDEO CAMERA

[75] Inventor: Michael P. MacKay, Vallejo, Calif.

[73] Assignee: Sony Corporation of America, Park Ridge, N.J.

[21] Appl. No.: 811,089

[22] Filed: Dec. 20, 1991

[51] Int. Cl.$^5$ .................... M04N 5/228; M04N 7/18
[52] U.S. Cl. .................................. 358/222; 358/105
[58] Field of Search ................... 358/222, 105, 213.11, 358/909, 229, 225

[56] References Cited

U.S. PATENT DOCUMENTS

| | | | |
|---|---|---|---|
| 4,673,276 | 6/1987 | Yoshida et al. | 354/430 |
| 4,788,596 | 11/1988 | Kawakami et al. | 358/222 |
| 4,855,838 | 8/1989 | Jones et al. | 358/229 |
| 4,959,725 | 9/1990 | Mandle | 358/222 |
| 4,965,619 | 10/1990 | Shikamui et al. | 354/410 |
| 4,979,034 | 12/1990 | Funaki | 358/105 |
| 5,060,074 | 10/1991 | Kinngasa et al. | 358/222 |

OTHER PUBLICATIONS

Product Announcement for: Panasonic PV-S770 Video Camcorder/HQ (1992).
Uomori, Morimura and Ishii, *Electronic Image Stabilization System for Video Cameras & VCRs*, SMPTE Journal, vol. 101, No. 2, Feb. 1992, pp. 66–75.

*Primary Examiner*—Michael T. Razavi
*Assistant Examiner*—Wendy R. Greening
*Attorney, Agent, or Firm*—Blakely, Sokoloff, Taylor & Zafman

[57] ABSTRACT

An electronic image stabilization method and apparatus has application for use in hand-held video camcorders. The electronic image stabilization apparatus, contained within the camcorder, comprises a definition television (HDTV) image sensor with photosensitive cells, a gimbaled lens configuration and signal processing circuitry. The lens configuration projects a subject image upon only a portion of the image sensor. As the hand-held camcorder is physically jittered, the lens configuration projects the subject image on a different portion of HDTV image sensor. A scanner circuit reads values from the cells, and a threshold circuit compares the values to a pre-determined threshold value. If the photosensitive cell value is greater, the the projected subject image in the larger HDTV image array is determined, only the photosensitive cells illuminated by the projected subject image extracted from the HDTV image sensor. As a result, jitter in the output image, caused by hand-held shakes, is reduce or eliminated.

16 Claims, 10 Drawing Sheets ic stabilization method and apparatus for stabilizing an image produced in a video camera

METHOD AND APPARATUS FOR STABILIZING AN IMAGE PRODUCED IN A VIDEO CAMERA

BACKGROUND OF THE INVENTION

1. Field of the Invention

The present invention relates to electronic stabilization of a video image, and more particularly, to a method and apparatus for reducing or eliminating jitter in a video image caused from hand shakes in a video camera.

2. Art Background

The reduction in size of video cameras and camcorders has resulted in the availability of hand-held video cameras or camcorders. The size of video cameras provides mobility for a camera-person allowing the video camera to be carried and subjects easily recorded. Although compact and to use, the hand-held video camera is often difficult to hold steady. As result of hand-held shakes from the camera-person, the video output is unstable and such instability results in poor quality video images.

In response to the hand-held video camera shake problem, there have been a number of inventions attempting to stabilize the output video The focus of these inventions has been on stabilizing the physical video camera in order to stabilize the video image. For example, Steadicam TM one such system which employs a pair of interconnected spring loaded One end of the arm is pivotally supported by a carrying brace, while the end is connected to a handle which mounts the camera at the center of moment of inertia. The carrying brace is worn by the camera-person, and weight of the camera is counter balanced by action in the spring loaded The Steadicam JR., a portable system, is limited by the weight of video camera. The Steadicam JR will only support camcorders weighing up to approximately 3.5 pounds. Furthermore, the use of the Steady Cam requires skill in order to obtain optimum quality in the video output.

Solid state image sensors, light weight and compact in size, provide advantage over older tube-type imagers. Because of this advantage, solid imagers were developed for applications requiring lightweight and size image sensors such as hand-held video cameras. The two types of state image sensors used in video cameras today are charged coupled (CCD) image sensors and metal oxide semiconductor (MOS) image sensors. In both devices, the image sensor comprises of an array of photosensitive elements. Each element, known as a picture element or pixel, generates a value over an interval of time whereby the value is dependent upon the intensity of light incident upon that photosensitive element. For both and MOS image sensors, the value is a negative charge generated by the photosensitive element. For images sensors compatible with the National Television Standards Committee (NTSC) standard, there may be 768 horizontal pixels and 482 vertical pixels. For image sensors to be for high definition television (HDTV), the array of photosensitive elements be as large as 1920 horizontal and 1035 vertical pixels.

In CCD image sensors, transferring of charge from the photosensitive elements out of the array is accomplished by either frame transfer, transfer, or a combination of the two methods known as frame-interline transfer. In all types of transfer methods, the CCD image sensor uses shift registers. The transfer methods are dependent upon the arrangement the image sensor's vertical registers. The CCD shift register is comprised of p-type silicon material covered with a thin insulating oxide film. On top of oxide layer are electrodes which are connected to clocking control applying a positive voltage to the electrode, the CCD shift register potential well which can store negative charge. By generating a series controlled clocking signals to the electrodes, the charges may be through the shift register and eventually out of the array.

FIG. 1a illustrates a frame transfer CCD image sensor. As shown FIG. 1a, the CCD image sensory is divided into optically sensitive section 10, store section 12 and line readout section 14. After a charge has accumulated in the photosensitive cells in image section 10, charge is transferred into store section 12 very rapidly. Upon transfer charges from image section 10 to store section 12, the photosensitive in store section 12 are emptied for preparation for the next exposure The charge, now stored in store section 12, may be transferred line by line readout section 14 and then gated by output gate 16.

Referring to FIG. 1b, an interline transfer CCD array is In the interline transfer technique, after an initial exposure period of photodiodes 22, charge is transferred from photodiodes 22 to vertical registers 18. In the interline transfer method, the charges are shifted vertical registers 18, and the charges on the bottom of vertical shift registers 18 are transferred into horizontal shift register 20. Then, the charges horizontal shift register 20 are shifted out of the array. In this way, charges are transferred, one at a time, down vertical shift registers then transferred out of the array through horizontal shift line by line.

During high speed transfer of charges from either the image area to stored area in frame transfer, or from the vertical shift registers in interline transfer, the potential wells accumulate extra unwanted charge which generate an effect known as vertical smear. The vertical smear results unwanted line super imposed upon the image. In FIG. 1c, frame interline, a technique which combines the vertical shift registers and field store area, is illustrated. One advantage of the frame interline charge transfer technique is the reduction of vertical smear. The charges are photodiode 22 to vertical registers 26, and then immediately transferred high speed to CCD field memory 28. This high speed transfer reduces the time in which vertical registers 26 may be affected by extra charge accumulation or vertical smear. Once the charges have been transferred field memory section 28, the charges are then transferred out of the CCD image sensor through the horizontal registers in much the same matter as the frame transfer technique.

SUMMARY OF THE INVENTION

An electronic image stabilization method and apparatus is disclosed which has application for use in video cameras and camcorders, and in particular, hand-held video cameras. As a camera-person physically moves the video camera while video taping a subject image, the resultant video image exhibits jitters thereby degrading the quality of the video image. The electronic stabilization apparatus comprises a video camera with a high density television (HDTV) image sensor. The HDTV image sensor has a plurality of cells that generate a value representative of light incident upon that cell, and a transferring circuit to transfer the cell values out of the HDTV image sensor. A lens configuration on the video camera projects a subject image with a spatial resolution compatible with NTSC or PAL standard format onto the larger HDTV image sensor. Because the HDTV image sensor has a greater spatial resolution than the desired NTSC or PAL standard spatial resolution, only a portion of the HDTV image sensor is illuminated by the subject image. As the camera is physically jittered, a gimbaled ring assembly coupled to the lens configuration projects the subject image on a different portion of the HDTV image sensor. The movement of the gimbaled ring assembly is limited by stoppers such that the outer limit of the stopper projects the subject image on an outer edge of the HDTV image sensor.

A scanner circuit reads the cell values generated by the HDTV image sensor one cell at a time. A scanner counter circuit generates an address representative of the location of the cell which is being read by the scanner circuit. A threshold comparator circuit then compares the scanned cell value to a pre-determined threshold value to determine whether the corresponding cell is illuminated by the subject image. If it is, an output of the threshold comparator circuit disables the scanning counter, and the scanning counter then holds the address of a corner of the subject image. The address is input to a control circuit which alters the clocks signals transferring the values out of the HDTV image sensor array. In this way, only the image area illuminated by the subject image is transferred out of the HDTV image sensor. As a consequence, a video signal is generated which reduces or eliminates physical jitter from the video image.

BRIEF DESCRIPTION OF THE DRAWINGS

The objects, features and advantages of the present invention will be apparent from the following detailed description in which.

DETAILED DESCRIPTION OF THE INVENTION

An method and apparatus for video image stabilization is disclosed. In the following description, for purposes of explanation, specific nomenclature is set forth to provide a thorough understanding of the present invention. However, it will be apparent to one skilled in the art that these specific details are not required in order to practise the present invention. In other instances, well known circuits and devices are shown in block diagram form in order not to obscure the present invention unnecessarily.

Figure 1A:
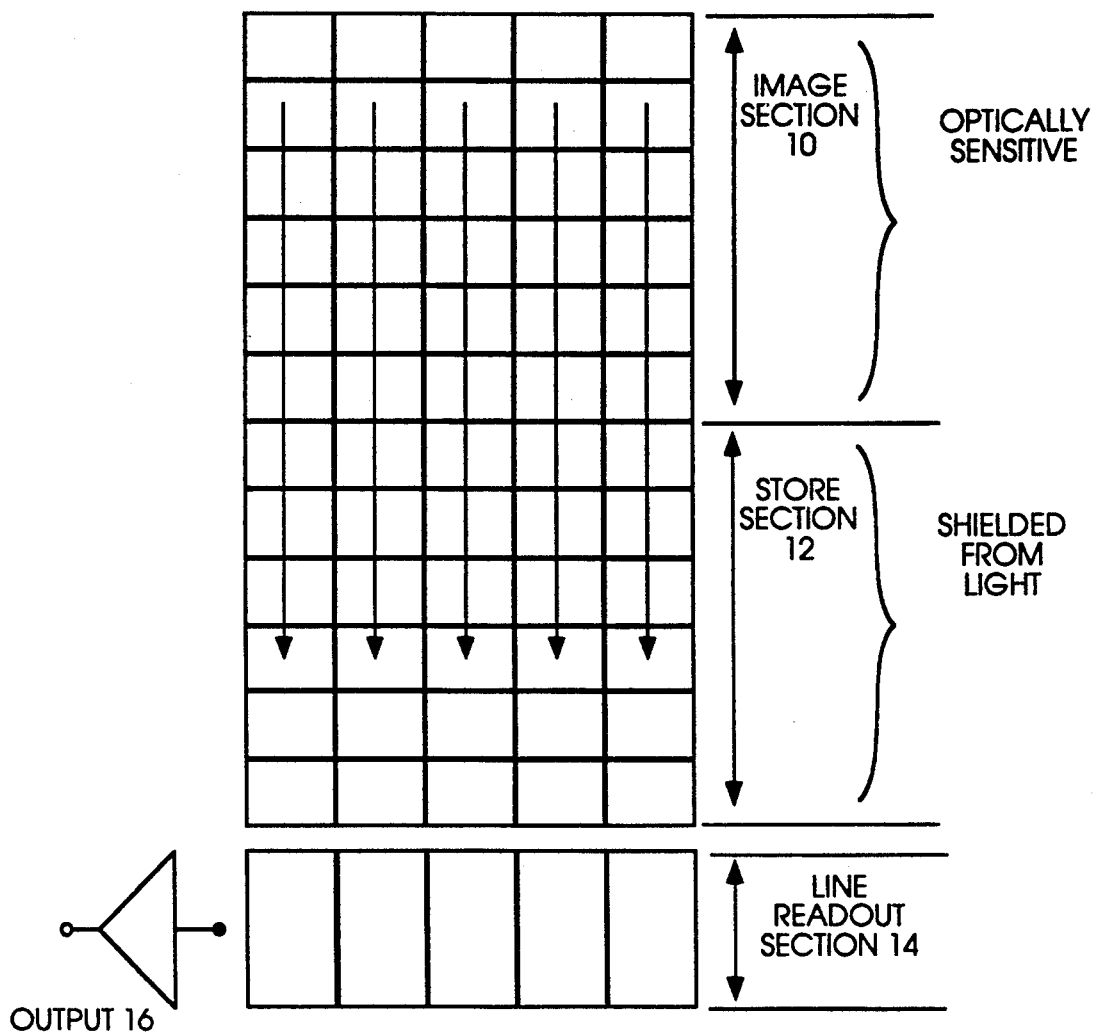
FIG. 1a is an illustration of a frame transfer CCD image sensor.
Figure 1B:
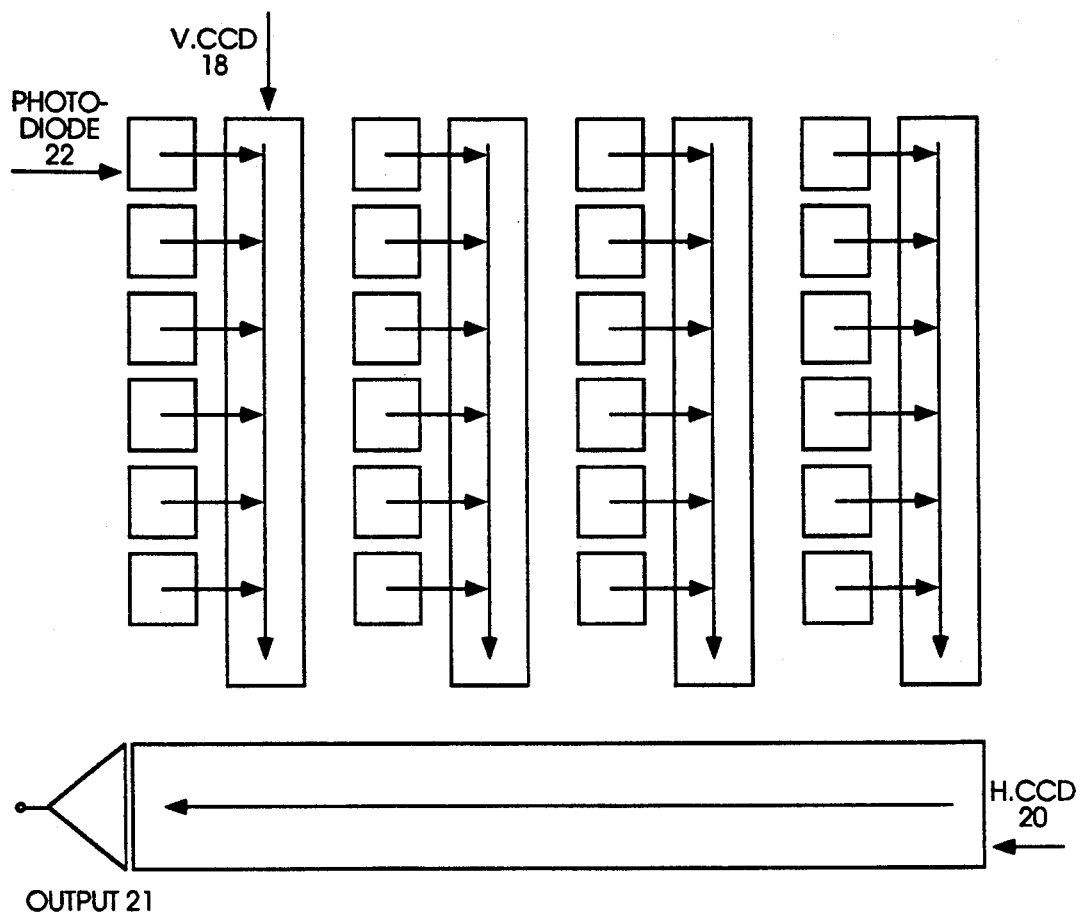
FIG. 1b is an illustration of an interline transfer CCD image sensor.
Figure 1C:
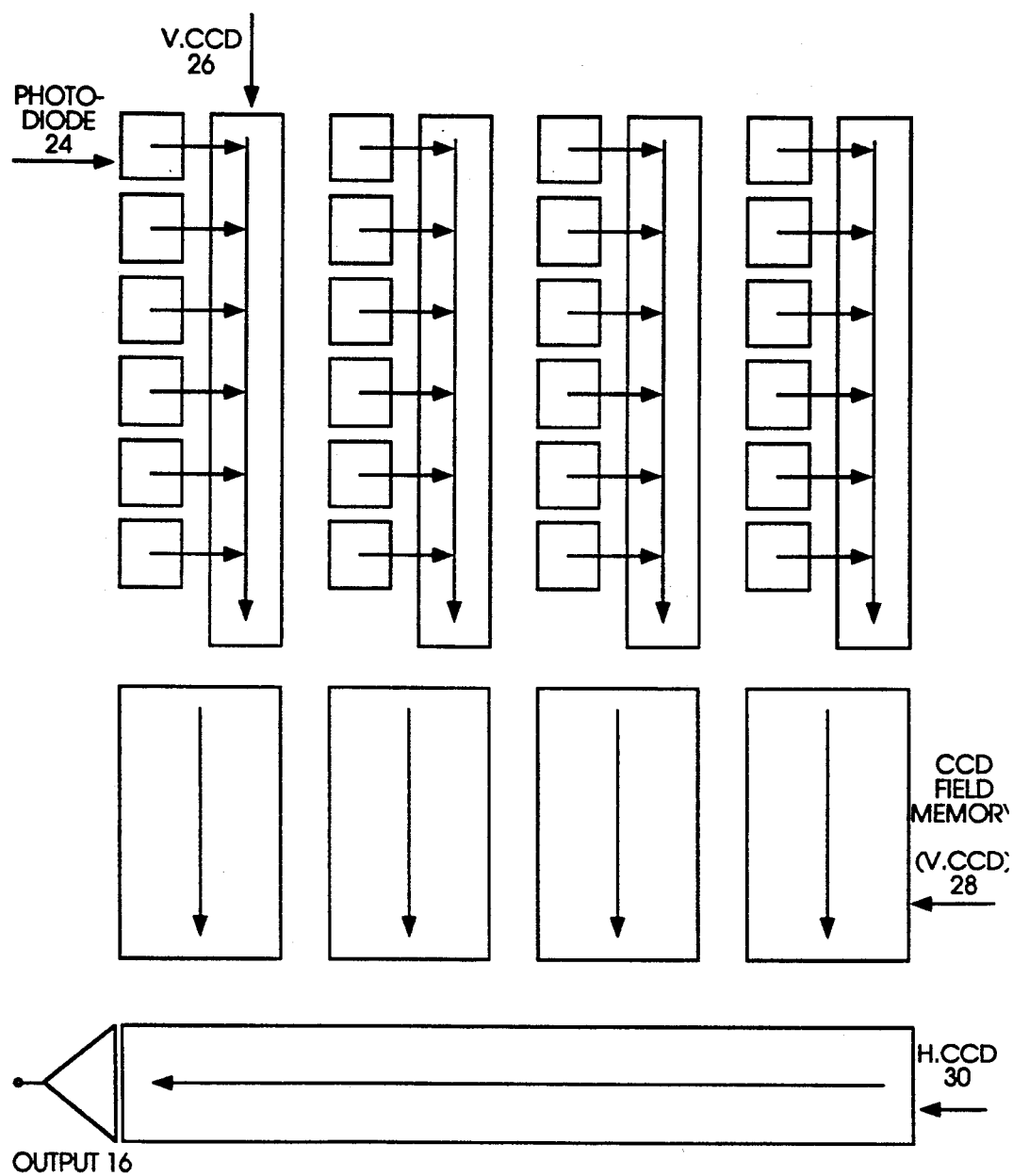
FIG. 1c is an illustration of a frame interline transfer CCD image sensor.
Figure 2B:
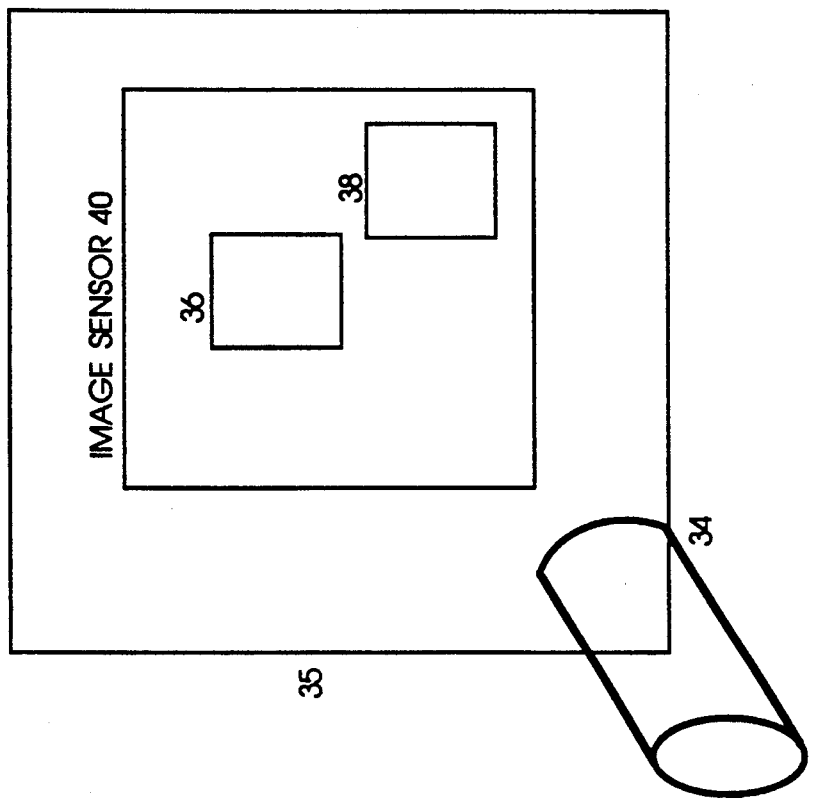
FIGS. 2a-2b are illustrations of the concept of the present invention.
Figure 2A:
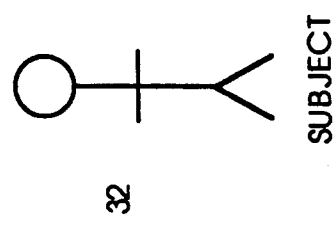

Referring to FIGS. 2a and 2b, the video image stabilization method of the present invention is illustrated. When camera 35 is held in a steady position, gimbaled lens configuration 34 will project subject 32 onto high definition television (HDTV) charged coupled device (CCD) image sensor 40 at subject image 36. Subject 32 may be focused upon HDTV CCD image sensor 40 so as to illuminate a number of pixels equal to any desired video format. For example, subject image 36 could be of a spatial resolution compatible with either the NTSC or PAL television standards. All that is required is that the projected image have a lower spatial resolution than the spatial resolution of the HDTV image sensor used. In the preferred embodiment, focused images 36 and 38 have a vertical resolution of 482 pixels and a horizontal resolution of 768 pixels, and HDTV image sensor 40 has a horizontal resolution of 1920 pixels and a vertical resolution of 1035 pixels.

Subject image 36 represents the location of subject 32 at an initial time, t(0), when camera 35 is held stable. When camera 35 is physically shaken, lens configuration 34 is displaced by the physical vibration, and as a result subject 32 is now projected onto HDTV image sensor 40 as subject image 38. At a predetermined time t(1), after the initial time t(0), camera 35 will transfer subject image 38 out of HDTV image sensor 40. The time interval between t(0) and t(1) is equal to an electronic shutter speed of camera 35. In video applications conforming to the NTSC standard format, shutter speeds are set to 1/60 of a second per video field. Because subject image 36 is centered on HDTV image sensor 40 when camera 35 is held in a steady position, subject 32 may be tracked in an equal distance in all directions. Consequently, at the end of each electronic shutter speed interval, subject 32 will be provided upon HDTV image sensor 40 representing the physical displacement, within limitations, occurring in that shutter speed time interval. At the end of each shutter speed interval, only the subject image portion of HDTV image sensor 40 will be transferred out of HDTV image sensor 40 as will be explained in detail below.

Figure 3A:
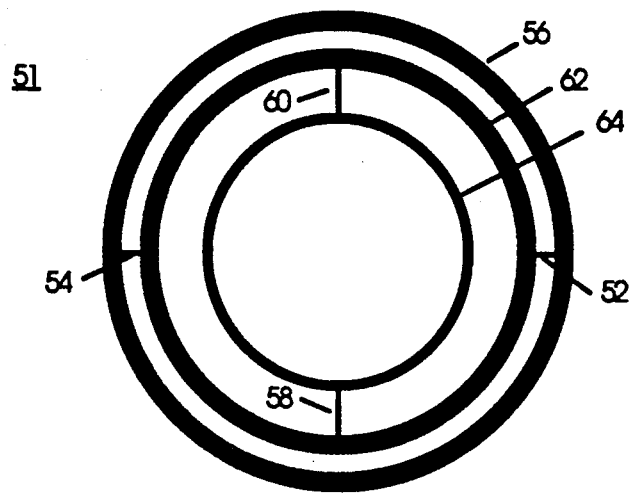
FIG. 3a is a front view of a gimbaled lens configuration of the present invention.
Figure 3B:
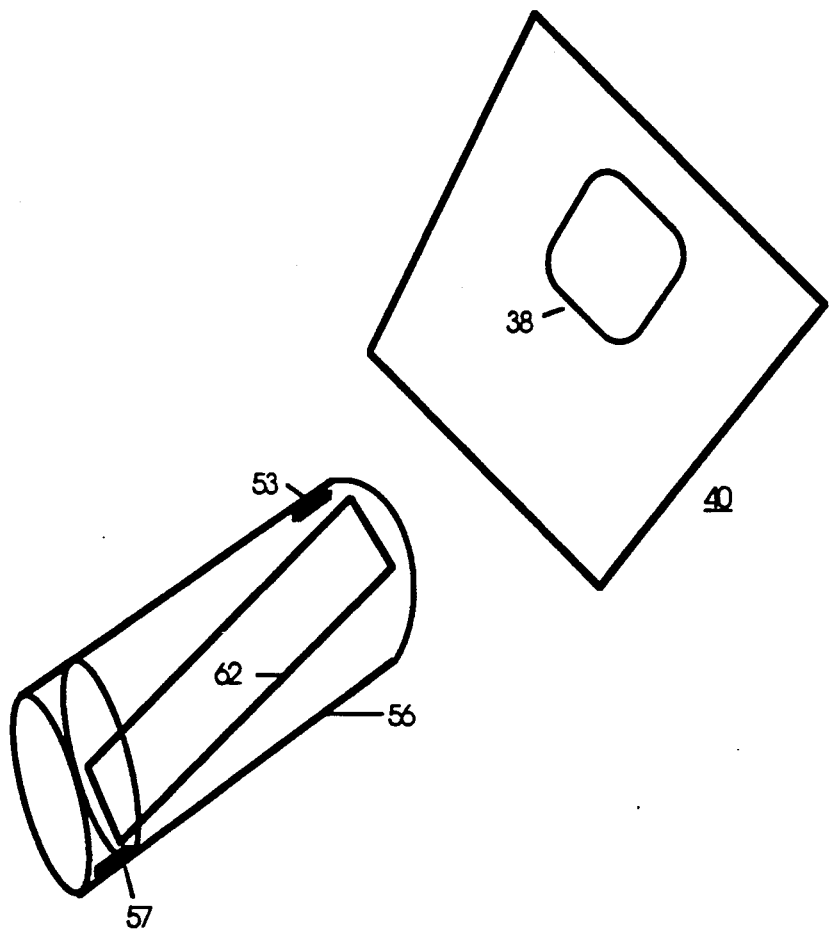
FIG. 3b is a right front perspective view of a gimbaled lens configuration and an HDTV image sensor of the present invention.

Referring to FIG. 3a, a front view of gimbaled lens configuration 51 is illustrated. Gimbaled lens configuration 51 has two mutually perpendicular and intersecting axes of rotation thereby giving free angular movement in two directions. In this way, lens configuration 51 is free to move in both X and Y directions with respect to a plane parallel to the face of CCD image sensor 40. Lens casing 56, a cylindrical shell, houses the gimbaled lens configuration. Outer gimbal ring 62 is mounted within lens casing 56, and outer gimbal ring 62 has a diameter less than lens casing 56. Outer gimbal pins 52 and 54 support outer gimbal ring 62 such that outer gimbal ring 62 is free to rotate in the Y-axis direction as shown in FIG. 3b. Vertical stoppers 53 and 57 provide limits in which outer gimbal ring 62 may extent within lens casing 56. As illustrated in FIG. 3b, if outer helical mount 62 is in the fully extended position as shown, then the subject image will be projected onto the top of HDTV image sensor 40. Therefore, outer gimbal ring 62 allows lens configuration 51 to project the subject image onto HDTV image sensor 40 in the Y-direction from the top to the bottom of CCD image sensor 40.

Figure 3C:
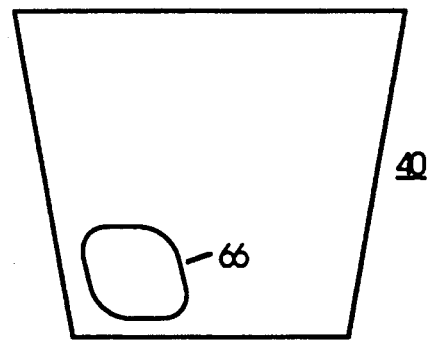
FIGS. 3c-3d are a top view a gimbaled lens configuration and an HDTV image sensor of the present invention.
Figure 3D:
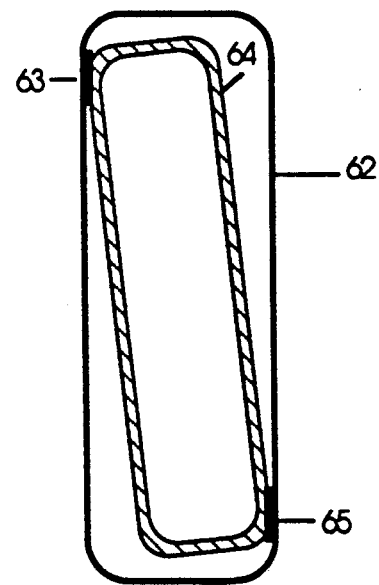

Helical mount 64, cylindrical in shape, is mounted within outer gimbal ring 62 by inner gimbal pins 58 and 60. Helical mount 64 may serve as a housing for any lens or lens combination desired. Inner gimbal pins 58 and 60 are mounted on the top and bottom of helical mount 64 so as to provide freedom of rotation in the X-axis with respect to the face of image sensor 40. Also, inner gimbal pins 58 and 60 are located in the front section of lens casing 56 so as to minimize the movement of the front portion of helical mount 64. As illustrated in the top view of lens configuration 51 in FIG. 3d, lens configuration 51 may only rotate as far as stoppers 63 and 65 will permit. When helical mount 64 is in this fully extended position, subject image 66 will be projected to the left side of HDTV image sensor as shown in FIG. 3c 40. As a result, when a video camera housing lens configuration 51 is physically displaced, the inner gimbaled mounting allows helical mount 64 to move in a horizontal direction with respect to the face of CCD image sensor 40. Similarly, the outer gimbaled mounting allows helical mount 64 to move in a vertical direction with respect to the face of HDTV image sensor 40.

In the preferred embodiment, standard interlaced video is employed. In interlaced video or field-integrated mode, the image sensor is divided into odd and even vertical lines. The scanning of the vertical lines are altered from one field to the next field and both the odd and even fields comprise a complete video frame. The odd field is generally scanned first followed by the even field. The alternate scanning of photosensitive elements results in proper color reproduction. The speed at which video images are exposed to the image sensor, and then subsequently clocked out of the array, is dependent upon the electronic shutter speed. Typically, for applications involving normal speeds, the shutter speed, or field period is 1/60 of a second. Correspondingly, one interlaced frame would occur at 1/30 of a second.

Figure 4:
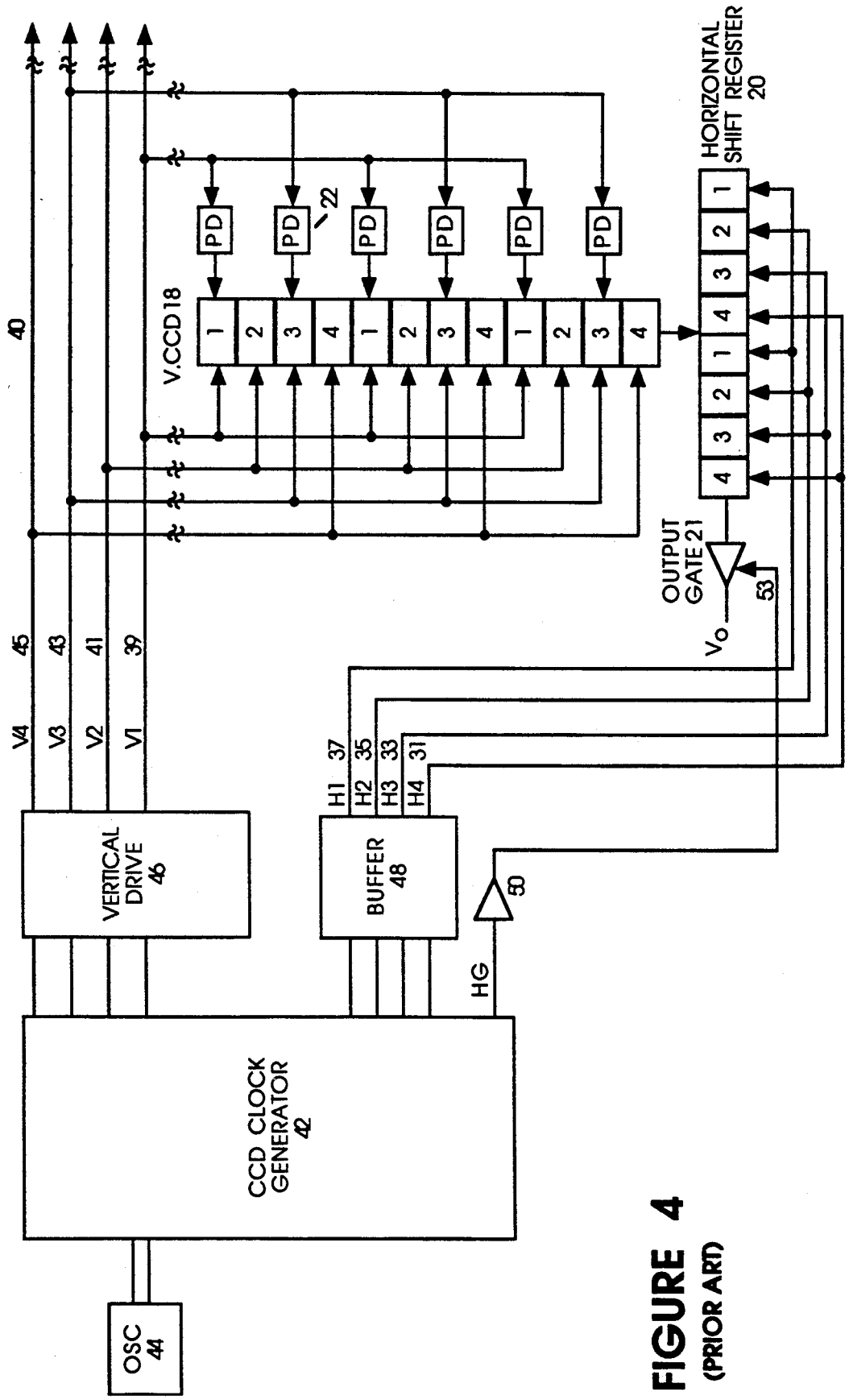
FIG. 4 is a portion of an interline transfer CCD image sensor with control circuitry.

Now referring to FIG. 4, a portion of an interline transfer CCD image sensor, and part of the CCD image sensor transfer circuitry is illustrated. In the preferred embodiment, CCD solid state image sensor 40 is of the interline transfer type. Although the invention has been described in conjunction with a interline transfer CCD image sensor, numerous alternatives, variations, modifications to a CCD interline transfer image sensor will be apparent to those skilled in the art in light of the foregoing description. The electrodes and the potential wells beneath them on both CCD vertical and horizontal shift registers 18 and 20 are arranged in groups of four as shown. Because of this arrangement, the method used for transferring the charges out of CCD image sensor 40 is four-phase double clocking. Charges may be transferred within a group of four potential wells, as well as from one group of wells to an adjacent group of wells. For any one video field in this particular arrangement, there are two photosensitive elements for a group of four potential wells. In FIG. 4, the photosensitive elements are photodiodes 22. The method of transfer of charge from photodiodes 22 and out of CCD image sensor 40 is identical for both the odd and even fields. For purposes of illustration, only the transfer of the odd video field is shown in FIG. 4. The transfer of negative charges from photodiodes 22 to the first two potential wells in vertical shift register 18 occurs during the vertical blanking period. In the horizontal blanking interval, the charges are moved in vertical shift register 18 from potential wells one and two of one group, to potential wells one and two of the next group. The charge in wells one and two at the well group at the bottom of vertical shift register 18 will be transferred into wells one and two of horizontal shift register 20. In the last interval, the horizontal scan period, the charges are clocked out of horizontal shift register 20 and gated by output gate 21. Output Vo is then sent to a video processing circuit.

As described above, the CCD potential wells are constructed in groups of four for both vertical and horizontal shift registers 18 and 20 with each potential well having a corresponding electrode. The electrodes in vertical shift register 18 are connected to vertical shift register clocking signals V1, V2, V3 and V4. Vertical shift register clocking signals V1, V2, V3 and V4 are generated by clock generator 42 and the appropriate drive levels of the signals are generated in vertical drive 46. At a first time interval in the vertical blanking period, a V1 positive voltage is applied to the first electrode of all potential wells in vertical shift register 18. This positive voltage allows the negative charge of corresponding photodiode 22 to be transferred to the first potential well underneath the first electrode. At a second timing interval in the vertical blanking period, a V2 positive voltage is applied to the second electrode, and consequently the charge from the first potential well is shared with the second potential well. At a third timing interval in the vertical blanking period, V1 goes low, and the remaining charge is then transferred entirely to the second potential well.

Connected to each electrode on horizontal shift register 20 are horizontal shift register clocking signals H1, H2, H3 and H4. H1, H2, H3 and H4 clocking signals are generated by CCD clock generator 42, and buffered by buffer 48. During the horizontal blanking period, the negative charge in vertical shift register 18 is moved from wells one and two of one group to wells one and two to the adjacent group. Also, the group at the very bottom of vertical shift register 18 transfers its charge to wells one and two of horizontal shift register 20. To accomplish this, H1 and H2 are held at a high voltage level during the horizontal blanking period so as to allow the negative charge from vertical shift register 18 to enter into the first two potential wells in horizontal shift register 20. The charge is held in potential wells one and two of horizontal shift register 20 until the horizontal scan period.

During the horizontal scan period, the entire line of charges stored in horizontal shift register 20 is transferred out of CCD image sensor 40 by the horizontal clocking signals H1, H2, H3 and H4. In a first time interval of the horizontal scan period, H1 and H2 transition to become a low voltage value while H3 and H4 are a high voltage value resulting in the transfer of charges from wells one and two to wells three and four in horizontal shift register 20. During a second time interval, the polarity of the control signals is reversed, and charges are transferred from wells three and four of one well group to wells one and two of the next adjacent well group. Output gate 21 is coupled to horizontal shift register 20 and operation of the gate is controlled by horizontal gating signal (HG). CCD image sensor 40 uses the horizontal gating (HG) signal to control its internal output gate and only allows charges to exit when the gate is open. Accordingly, when HG is low, charges will not exit horizontal shift register 20 but when HG is high logic level, the charges will be gated and transferred to video signal processing circuits. The horizontal blanking and the horizontal scan period are repeated until all of the horizontal lines have been shifted out of CCD image sensor 40.

Figure 5:
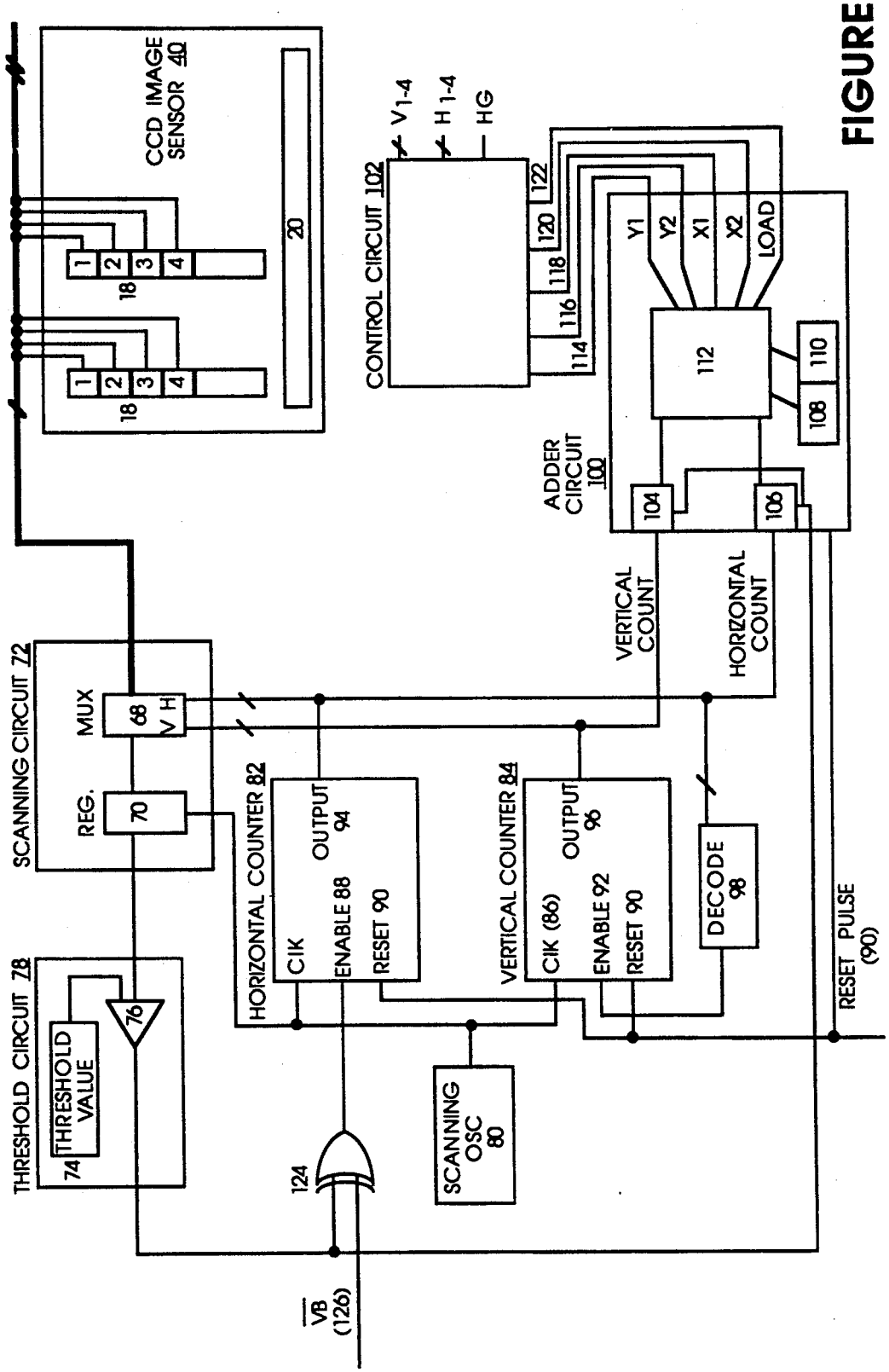
FIG. 5 is a high level block diagram illustrating circuitry of the present invention.

Referring now to FIG. 5, a block diagram of a preferred embodiment is illustrated. During an exposure time interval, photosensitive elements are charged dependent upon light intensity incident upon the photosensitive elements. During the vertical blanking period, the negative charges located in the photosensitive elements are transferred to vertical registers 18 of CCD image sensor 40. CCD clock generator 42 is enabled when a logic high voltage value is applied to enable 158 on FIG. 6. At the beginning of the vertical blanking period, VB 126, generated by clock counter 128, will supply a logic high voltage to OR gate 130. Although the load signal 122 will be a logic low voltage level at the beginning of the vertical blanking period, VB 126 will enable CCD clock generator 42. Upon completion of the vertical blanking period, VB 126 will transition to a low voltage level, and therefore OR gate 130 will supply a logic low voltage value to enable pin 158. By disabling CCD clock generator 42, the horizontal blanking period will be suspended until load signal 122 becomes a logic high voltage level. At this time, OR gate 130 will again output a high logic level to enable pin 158 thereby causing CCD clock generator 142 to resume with the horizontal blanking period.

Figure 6:
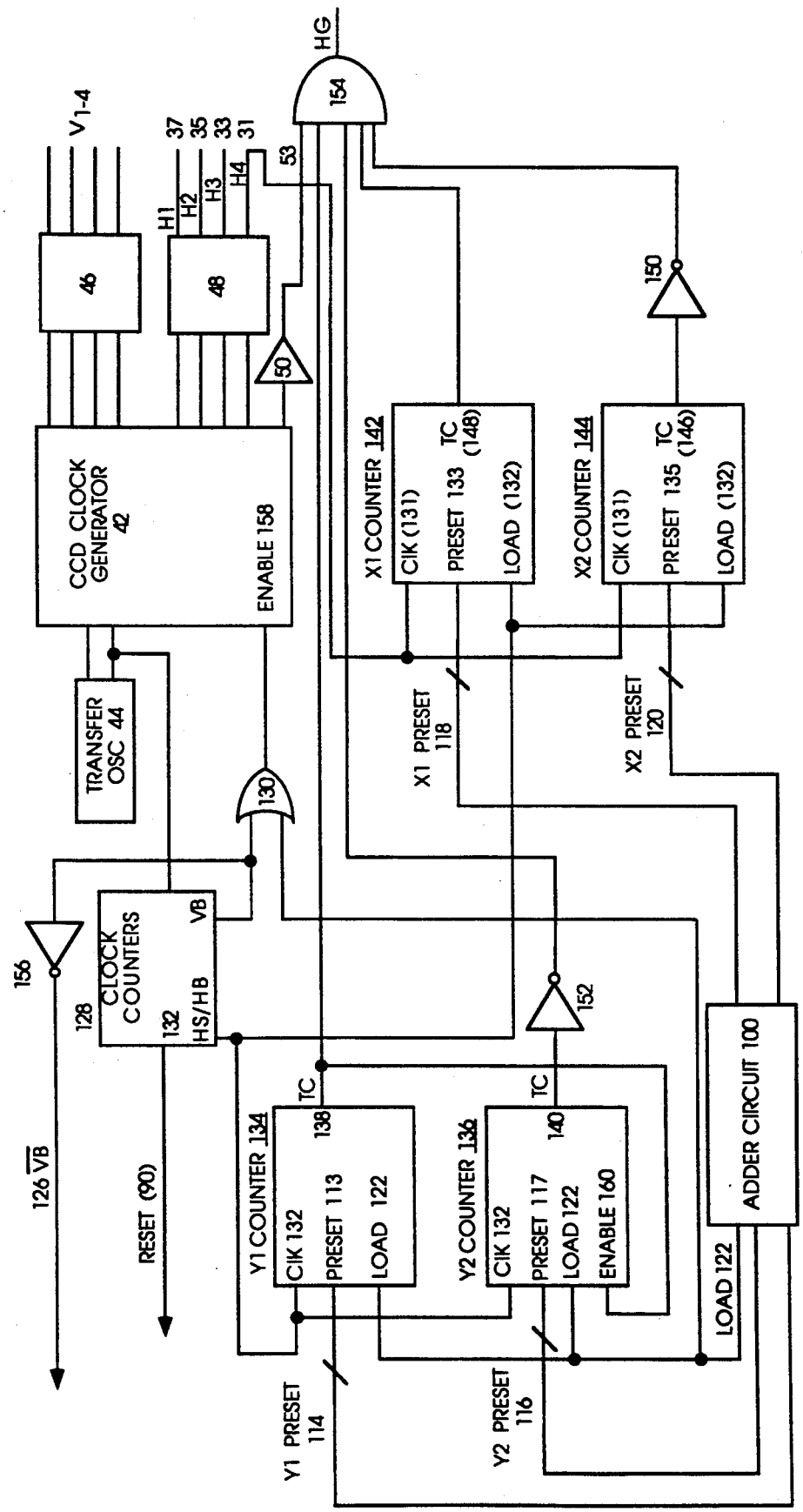
FIG. 6 is a block diagram illustrating the control circuit of the present invention.

Referring to FIG. 6, VB will have a low logic level after the vertical blanking period is finished as described in the previous paragraph. Inverter 156 will output a signal $VB_{BAR}$ 126 which will have a high voltage state after the vertical blanking period. $VB_{BAR}$ 126 is input to XOR gate 124 and as a consequence horizontal counter 82 is enabled. Returning to FIG. 5, each potential well of vertical shift register 18 located in CCD image sensor 40 is connected to MUX 68 in scanning circuit 72. The charged values will be selected by MUX 68. Output registers 94 and 96 of horizontal and vertical counters 82 and 84 are connected to MUX 68. Output registers 94 and 96 are addresses for selecting the vertical and horizontal potential wells in CCD image sensor 40. The values contained in output registers 94 and 96 correspond to a particular vertical shift register location on CCD image sensor 40. The top portion of CCD image sensor 40 begins the first horizontal line of CCD potential wells, and the left portion of CCD image sensor 40 begins a first vertical line of vertical shift registers.

In the preferred embodiment, the scanning of CCD image sensor 40 begins with the first horizontal line at first vertical shift register 18. The horizontal line is scanned from left to right although any direction of scanning would suffice. Upon completion of scanning the first horizontal line, the next lower horizontal line is scanned also starting with the first vertical shift register. When the initial horizontal and vertical count are both 0, MUX 68 will receive the address (0,0) from horizontal and vertical counters 82 and 84. This address will select a line connected to a potential well located in the first vertical shift register in the first horizontal line. Scanning oscillator 80 is coupled to both latch register 70 in scanning circuit 72 and clock inputs 86 of vertical and horizontals counters 82 and 84. On a leading clock edge of scanning oscillator 80, the (0,0) address will be provided to MUX 68, and the charged value of the selected potential well will be provided to register 70. On a falling clock edge of scanning oscillator 80, the charged value will be latched in register 70, and horizontal counters 82 will be incremented. Similarly, on the rising edge of the next scanning oscillator clock cycle, MUX 68 will select the next potential well in CCD image sensor 40 corresponding to the (1,0) address. Horizontal counter 82 is cascaded to vertical counter 84 so that when horizontal counter 82 reaches its terminal count of 768, the vertical count will be incremented by one. In this way, scanning circuit 72 will read each charged value within the vertical shift registers one potential well at a time.

As illustrated in FIG. 5, the output of register 70 is connected to an input of comparator 76 of threshold circuit 78. A voltage is applied to each photosensitive cell in CCD image sensor 40 for operation of the photosensitive cells. As a consequence, even cells not exposed to light will exhibit a small negative charge. The amount of quiescent charge is referred to as black noise of the cell. The black noise level of a cell is a pre-determined voltage value dependent upon the particular type of photosensitive cell used. In the preferred embodiment, this pre-determined black noise level is threshold value 74 in threshold circuit 78. Threshold value 74 is input to comparator 76 of threshold circuit 76. Comparator circuit 76 compares the charged value in register 70 to threshold value 74. If the charged value contained within register 70 is greater than pre-determined threshold value 74, the output of comparator 76 generates a high voltage level.

If the output on comparator 76 indicates that the selected shift register contains a charge greater than threshold value 74, then the top left corner of the subject image on CCD image sensor 40 has been found. The output of comparator circuit 76 is buffered so as to be able to drive a plurality of inputs. When threshold circuit 78 generates a high output voltage signal, scanning circuit 72, vertical and horizontal counters 96 and 94 are all disabled. Enable 88 on horizontal counter 82 is connected to XOR gate 124. $VB_{BAR}$ 126, input to XOR gate 124, will be a high voltage value signifying the completion of the vertical blanking period. Therefore, a high voltage value input from threshold circuit 78 will result in a low voltage value to enable pin 88 and subsequently disable horizontal counter 82. As a consequence, vertical counter 84 will also be disabled because of horizontal counter will not reach it terminal count necessary to enable pin 92 of vertical counter 84. Decoder 98 will decode output register 94 so as to enable pin 92 on vertical counter 84 when horizontal counter 82 has reached the maximum horizontal count. In the preferred embodiment, when horizontal counter 82 reaches the value of 768, vertical counter 84 will be enabled. Contained in output registers 94 and 96 located in horizontal and vertical counters 82 and 84 are horizontal count and vertical count values respectively. X and Y count values correspond to the address of a potential well containing the charge corresponding to the upper left corner of the subject image on CCD image sensor 40. With the pre-determined knowledge of the spatial resolution size of the subject image and the determination of the address of the upper left corner of the subject image, the information to extract only the charged cells containing the subject image is obtained.

Adder circuit 100 calculates two Y preset values, two X preset values and a load signal for use in control circuit 102. Both the horizontal count and the vertical count values are used in these calculations. Upon finding an illuminated pixel on CCD image 40 corresponding to the top left corner of the subject image, threshold circuit 78 will latch horizontal count and vertical count in registers 104 and 106, respectively, in adder circuit 100. Also, the horizontal and vertical resolution values for the subject image are pre-stored within adder circuit 100 in registers 108 and 110. In the preferred embodiment, the pixel element resolution for the subject image is 768 horizontal pixels by 482 vertical pixels, but any horizontal or vertical resolution could be pre-stored within adder circuit 100. Also, horizontal and vertical resolution values could be connected to a user interface such that the values are selectable for a particular application. To calculate Y1 preset value 114, vertical resolution, stored in register 110, is added in computation circuit 112 to vertical count stored in register 104. The sum is then subtracted, also in computation circuit 112, from the HDTV vertical image resolution size. In the preferred embodiment, the HDTV vertical resolution size is 1035, and therefore Y1 preset is equal to 1035−(482+Vertical count). Y2 preset value is simply equal to vertical count.

Adder circuit 100 also calculates X1 and X2 preset values. X1 preset value is set equal to the horizontal count value. X2 preset value is calculated from adding horizontal resolution value in register 108 to horizontal count value in register 106, and then subtracting the sum from the horizontal resolution of the HDTV image sensor. In the preferred embodiment, the horizontal resolution of the HDTV CCD image sensor is 1920 pixels. Therefore, in this example, X2 preset is equal to 1920−(768+horizontal count). X1, X2, Y1 and Y2 preset values are stored in registers within computation circuit 112 and load signal 122 is generated. Referring to FIG. 6, a more detailed block diagram of control circuit 102 is illustrated. Upon generation of load signal 122, Y1 and Y2 presets are loaded into preset inputs of Y1 and Y2 counters 134 and 136. Charge transfer oscillator 44, used by CCD clock generator 42 to generate control clocking signals, is input to clock counter 128. Clock counter 128 divides the fundamental frequency of charge transfer oscillator 44 to represent timing intervals VB and HS/HB. VB is a clock with a period equal to the vertical blanking period in CCD clock generator 42. HS/HB is also a clock with a period equal to the horizontal blanking and scan periods. Because HS/HB clocks Y1 counter 134 and Y2 counter 136, Y1 counter 134 will be incremented after a horizontal blanking and horizontal scanning intervals have elapsed. Therefore, each increment in Y1 counter will occur when one horizontal line of charge has been extracted from CCD image sensor 40. TC 138 and 140 located on Y1 and Y2 counters respectively, are initially in a low logic level, but when Y1 and Y2 counters 134 and 136 reach a terminal count, TC 138 and 140 will be at a high logic level. TC 138 of Y1 counter is coupled to one input of 5 input AND gate 154.

Clock inputs 131 of X1 and X2 counters 142 and 144 are coupled to output clocking signal H3 on CCD clock generator 42. H3 and H4 clocking control signals are only active during the horizontal scan period, and therefore both X1 and X2 counters 142 and 144 will only be incremented during the horizontal scan period. X1 and X2 present values 118 and 114 are loaded into present registers 133 and 135 respectively. Loading occurs when the load signal is generated from adder circuit 100, which is the same time Y1 and Y2 present registers 114 and 116 are loaded. Tc 148 on X1 counter 142 is coupled to a second input on AND gate 154, and TC 146 on X2 counter 144 is coupled to a third input to AND gate 154 via inverter 150. As is the case in TC 138 in Y1 counter 134, the initial TC value before terminal count has occurred is a low voltage level. Because of the initial low voltage state of TC 148, HG will be disabled until the terminal count has been reached by X1 counter 142.

Figure 7:
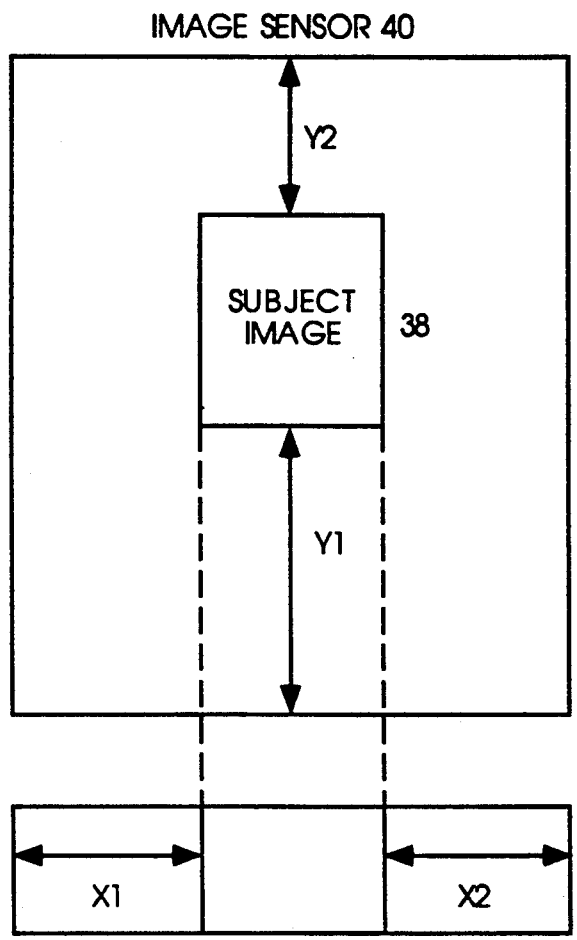
FIG. 7 is an illustration of an HDTV image sensor of the present invention.

Upon completion of the loading of all preset counter registers, CCD clock generator 42 is enable by load signal 122 at enable pin 158. At this point, control clocking signals will be generated in CCD clock generator 42, and the horizontal blanking and scanning periods may proceed. TC 138 on Y1 counter 134 will initially possess a low voltage value, and therefore will generate a low voltage level at AND gate 154. As a consequence of the state of TC 138, HG will be a low value and no charges will be gated out of the horizontal shift register. As each horizontal blanking and scanning period is completed, clock cycle HS/HB input to Y1 and Y2 counters 134 and 136 will increment the counters. Terminal count is obtained in Y1 counter 134 when the value in Y1 counter registers is equal to preset Y1 value 114 plus the number of horizontal lines extracted from CCD image sensor 40. When the terminal count of Y1 counter 134 occurs, TC 138 becomes low and will no longer disable HG. The number of horizontal lines in which will not be gated because of Y1 counter 134 disabling of HG is represented in FIG. 7 by the area designated Y1. Therefore, at the terminal count of Y1 counter 134, all the charges in CCD image sensor 40 will be shifted the distance represented by the area Y1, and consequently no charges exiting the horizontal shift register will be gated. At this time, the charge representing the subject image illustrated in CCD image sensor 40 will now appear on the bottom of the vertical registers in CCD image sensor 40.

After Y1 counter 134 has reached its terminal count, TC 138 will not longer disable horizontal gating. Unlike Y1 counter 134, which is incremented only after horizontal scan and horizontal blanking periods have occurred, X1 and X2 counters 142 and 144 are incremented after each clock cycle of H3 within the horizontal scan period. Both X1 and X2 counters 142 and 144 will reach terminal count every horizontal scan period, and as a consequence X1 preset value 118 and X2 preset value 114 but be re-loaded every horizontal scan period. The re-loading of X1 and X2 preset values 142 and 144 occurs after the horizontal scan period and during the horizontal blanking period. In operation, at the beginning of each horizontal scan period, X1 counter 142 will disable HG because of the low voltage value of TC 148 at AND gate 154. The period in which X1 counter disables HG is illustrated in FIG. 7 by the area designated X1.

Upon the terminal count of X1 counter 142, HG will be enabled and the charges will be gated out of image sensor 40 until the terminal count of X2 counter 144 occurs. At this time, TC 146 becomes a high voltage value, and inverting the signal by inverter 150 will disable HG. As a consequence, HG will remain disable for the remainder of the horizontal scan period. The period in which X2 counter 144 disables HG is represented in FIG. 7 by the area designated as X2. After the horizontal scan period is completed, X1 and X2 present values 118 and 114 are re-loaded for preparation for the next horizontal scan period by the rising edge of HS/HB designating a new horizontal blanking period.

The last of control circuit 102 counter to be enabled is Y2 counter 136. Enable 160 on Y2 counter 136 is coupled to TC 138 on Y1 counter 134, and therefore Y2 counter 136 is not enabled until Y1 counter 134 has reached its terminal count. Y2 counter 136 is loaded with Y2 preset value in the same manner as Y1 preset value 114 is loaded into Y1 counter 134. TC 140 on Y2 counter 136 is also coupled to an input on AND gate 154. In operation, Y2 counter 136 will began counting horizontal blanking and horizontal scan periods when the subject image has begun to enter the horizontal shift registers. HG will be enabled during this period so as to clock out the charged registers representing the subject image. Upon completion of clocking out all the changes remaining in the vertical shift registers, TC 140 will become a high voltage level, and after inverting the signal by inverter 152, will disable AND gate 154. The disabled horizontal gating period as a result of Y2 counter 136 is indicated in FIG. 7 by the area designated Y2.

When the last charge has been shifted out of the vertical and horizontal shift registers, CCD clock generator 42 will reset itself, and the vertical blanking period will begin on the even field. Also, a third clock counter within clock counter 132, will generate reset signal 90 after the last charge has been transferred out of CCD image sensor 40. Reset signal 90 is coupled to adder circuit 100, horizontal counter 82 and vertical counter 84. Horizontal and vertical counters 82 and 84 are then reset to an initial state. In adder circuit 100, vertical and horizontal count registers 104 and 106 are cleared, as well as Y1, Y2, X1, X2 and load signal in computation circuit 112. As a consequence, all circuits are reset to an initial set to begin the next vertical blanking period.

The foregoing has described a method and apparatus for image stabilization. It is contemplated that changes and modifications may be made by one of ordinary skill in the art, to the materials and arrangements of elements of the present invention without departing from the spirit and scope of the invention.

I claim:

1. An electronic image stabilization apparatus for stabilizing a video image generated from a source image input to a video camera, said electronic image stabilization apparatus comprising:

image sensor means for recording said source image, said image sensor means comprising;

a plurality of photosensitive cells, each of said plurality of photosensitive cells having a surface area and generating a cell value proportional to light intensity incident upon said surface area of said photosensitive cell, and transferring means for shifting said cell values out of said image sensor;

focusing means for projecting said source image upon said image sensor so as to generate a first image area, said first image area comprising each surface area of said plurality of photosensitive cells illuminated by said source image, said first image area having a total surface area less than said image sensor total surface area by at least one of said cell surface areas;

floating means coupled to said focusing means for moving said first image area within said image sensor such that physical jitter of said video camera results in said source image being projected onto a second image area, said second image area being equal in surface area to said first image area, and said second image area illuminating at least one different photosensitive cell than said first image area in said image sensor, said floating means comprises an outer gimbaled ring and a helical mount, said outer gimbaled ring being coupled to said helical mount, and said helical mount being coupled to said focusing means so as to provide free angular movement for said focusing means in both a horizontal direction and vertical direction with respect to a plane parallel to said image sensor;

scanning means coupled to each of said plurality of photosensitive cells for reading cell values of each of said plurality of photosensitive cells, said scanning means selecting one of said plurality of photosensitive cells and reading a cell value corresponding to said photosensitive cell selected;

threshold means coupled to said scanning means for determining whether said cell value selected is within said second image area, said threshold means having a threshold value and a flagging means wherein said flagging means generates a flag signal when said cell value selected is greater than said threshold value; and control means coupled to said threshold means and said image sensor means for allowing said transferring means of said image sensor, when said flag signal is present, to transfer out of said image sensor only said cell values within said second image area.

2. An electronic image stabilization apparatus as set forth in claim 1 wherein said image sensor is a high density television (HDTV) charged coupled device (CCD) image sensor.

3. An electronic image stabilization apparatus as set forth in claim 2 wherein said transferring means of said HDTV CCD image sensor is interline transfer.

4. An electronic image stabilization apparatus as set forth in claim 2 wherein said transferring means of said HDTV CCD image sensor is frame transfer.

5. An electronic image stabilization apparatus as set forth in claim 2 wherein said transferring means of said HDTV CCD image sensor is frame interline transfer.

6. An electronic image stabilization apparatus as set forth in claim 1 wherein said transferring means further comprising a plurality of clocking signals, shift register means for conducting said cell values and an output gate, said transferring means applying said clocking signals to said shift register means and said output gate so as to control transfer of said cell values through said shift register means and said output gate.

7. An electronic image stabilization apparatus as set forth in claim 1 wherein said plurality of photosensitive cells of said image sensor are arranged in an array so as to form a top parameter, a bottom parameter, a left parameter and a right parameter of said image sensor, and said scanning means selecting one of said plurality of photosensitive cells by generating a X address and a Y address unique to each of said plurality of photosensitive cells, said X address defining a number of cells in a horizontal direction from said left parameter of said image sensor, and said Y address defining a number of cells in a vertical direction from said top parameter of said image sensor.

8. An electronic image stabilization apparatus as set forth in claim 1 wherein said threshold value is a black noise quiescent charge of a photosensitive element in said image sensor.

9. An electronic image stabilization apparatus as set forth in claim 7 wherein said control means comprises calculation means and gating means, said calculation means being coupled to said X address and said Y address of said scanning means for providing four disabling distances, a first horizontal disabling distance being equal to a number of photosensitive cells between said left parameter of said image sensor and said X address corresponding to said cell value selected, a second horizontal disabling distance being equal to a number of cells between said right parameter of said image sensor and said X address corresponding to said cell value selected plus a number of cells contained within said second image area in a horizontal direction, a first vertical disabling distance being equal to a number of cells between said top parameter of said image sensor and said Y address corresponding to said cell value selected, and a second vertical disabling distance being equal to a number of cells between said bottom parameter of said image sensor and said Y address corresponding to said cell value selected plus a number of cells contained within said second image area in a vertical direction, said gating means being coupled to said transferring means and said calculation means for disabling said output gate of said transferring means, said gating means disabling said clocking signal to said output gate when said cell values are located within any of said four disabling distances.

10. An electronic image stabilization apparatus for stabilizing a video image generated from a source image input to a video camera, said electronic image stabilization apparatus comprising:
- an image sensor for recording said source image, said image sensor comprising;
  - a plurality of photosensitive cells, each of said plurality of photosensitive cells having a surface area and generating a cell value, said plurality of photosensitive cells being arranged in an array so as to form a top parameter, a bottom parameter, a left parameter and a right parameter of said image sensor, said cell value being proportional to light intensity incident upon said surface area of said photosensitive cells, and
  - a transferring device for shifting said cell values out of said image sensor, said transferring device having clocking signals, shift registers for conducting said cell values and an output gate, said transferring device applying said clocking signals to said shift registers and said output gate so as to control transfer of said cell values through said shift registers and said output gate;
- a lens for projecting said source image upon said image sensor so as to generate a first image area, said first image area comprising each surface area of said plurality of photosensitive cells illuminated by said source image, said first image area having a total surface area less than said image sensor total surface area by at least one of said cell surface areas;
- a gimbaled configuration coupled to said lens for moving said first image area within said image sensor such that physical jitter of said video camera results in said source image being projected onto a second image area, said second image area being equal in surface area to said first image area, and said second image area illuminating at least one different photosensitive cell than said first image area in said image sensor said gimbaled configuration comprises an outer gimbaled ring and a helical mount, said outer gimbaled ring being coupled to said helical mount, and said helical mount being coupled to said lens so as to provide free angular movement for said lens in both a horizontal direction and vertical direction with respect to a plane parallel to said image sensor;
- a scanning circuit for reading said cell value of each of said plurality of photosensitive cells, said scanning circuit being coupled to each of said cell values of said image sensor, said scanning circuit selecting one of said plurality of photosensitive cells and reading a cell value corresponding to said photosensitive cell selected by generating a X address and a Y address unique to each of said plurality of cells, said X address defining a number of cells in a horizontal direction from said left parameter of said image sensor, and said Y address defining a number of cells in a vertical direction from said top parameter of said image sensor;
- a threshold circuit coupled to said scanning circuit for determining whether said cell value selected is within said second image area, said threshold circuit having a threshold value and a comparator wherein said comparator generates a flag signal when said cell value selected is greater than said threshold value; and
- a control circuit coupled to said comparator of said threshold circuit for allowing said transferring device of said image sensor to transfer out of said image sensor, when said flag signal is present, only said cell values within said second image area, said control circuit comprising;
  - a counter circuit coupled to said X address and said Y address of said scanning circuit for providing four disabling distances, a first horizontal disabling distance being equal to a number of photosensitive cells between said left parameter of said image sensor and said X address corresponding to said cell value selected, a second horizontal disabling distance being equal to a number of cells between said right parameter of said image sensor and said X address corresponding to said cell value selected plus a number of cells contained within said second image area in a horizontal direction, a first vertical disabling distance being equal to a number of cells between said top parameter of said image sensor and said Y address corresponding to said cell value selected, and a second vertical disabling distance being equal to a number of cells between said bottom parameter of said image sensor and said Y address corresponding to said cell value selected plus a number of cells contained within second said image area in a vertical direction, and
  - a gating circuit coupled to said transferring device and said counter circuit for disabling said output gate of said transferring device, said gating circuit disabling said clocking signal to said output gate when said cell values are located within any of said four disabling distances.

11. An electronic image stabilization apparatus as set forth in claim 10 wherein said image sensor is a high density television (HDTV) charged coupled device (CCD) image sensor.

12. An electronic image stabilization apparatus as set forth in claim 11 wherein said transferring device of said HDTV CCD image sensor is interline transfer.

13. An electronic image stabilization apparatus as set forth in claim 11 wherein said transferring device of said HDTV CCD image sensor is frame transfer.

14. An electronic image stabilization apparatus as set forth in claim 11 wherein said transferring device of said HDTV CCD image sensor is frame interline transfer.

15. An electronic image stabilization apparatus as set forth in claim 10 wherein said threshold value is a black noise quiescent charge of a photosensitive element in said image sensor.

16. A method of electronic image stabilization for stabilizing a video image generated from a source image input to a video camera, said electronic image stabilization method comprising the steps of:

providing an image sensor having a plurality of photosensitive cells and a transferring means, each of said plurality of photosensitive cells having a surface area and generating a cell value proportional to light intensity incident upon said surface area of said photosensitive cell, said transferring means shifts said cell values out of said image sensor;

focusing said source image upon said image sensor so as to generate a first image area, said first image area comprising each surface area of said plurality of photosensitive cells illuminated by said source image, said first image area having a total surface area less than said image sensor total surface area by at least one of said cell surface areas;

floating said source image within said image sensor such that physical jitter of said video camera results in said source image being projected onto a second image area, said second image area being substantially equal in surface area to said first image area, and said second image area illuminating at least one different photosensitive cell than said first image area in said image sensor;

selecting a cell value from said plurality of photosensitive cells;

determining whether said cell value selected is within said second image area; and controlling said transferring means in said image sensor when said selected cell value is within said second image so as to shift out only said cells values within said second image area.

* * * * *